United States Patent [19]
Wetzel et al.

[11] 4,395,298
[45] Jul. 26, 1983

[54] METHOD AND APPARATUS FOR MAKING TOOTHED BELTS AND BELT MADE EMPLOYING SAME

[75] Inventors: Robert E. Wetzel, Springfield, Mo.; Wayne C. Fieler, Orangeburg, S.C.; Gerald C. Hollaway, Springfield, Mo.

[73] Assignee: Dayco Corporation, Dayton, Ohio

[21] Appl. No.: 372,585

[22] Filed: Apr. 28, 1982

Related U.S. Application Data

[63] Continuation of Ser. No. 205,832, Nov. 10, 1980, abandoned.

[51] Int. Cl.³ .......................... B29D 17/00; B29H 7/22
[52] U.S. Cl. ..................................... 156/137; 156/138; 156/139; 156/162; 156/426; 156/428; 156/431; 156/446; 156/495; 264/145; 264/210.2
[58] Field of Search ............ 264/145, 236, 152, 210.1, 264/210.2, 284; 156/264, 137, 139, 138, 162, 426, 428, 431, 446, 495

[56] References Cited
U.S. PATENT DOCUMENTS

| 2,760,228 | 8/1956 | Verges | 264/210.2 |
| 3,792,621 | 2/1974 | Smith | 74/231 R |
| 3,999,914 | 12/1976 | Breher et al. | 425/114 |
| 4,083,838 | 4/1978 | Breher | 264/145 |
| 4,122,137 | 10/1978 | Böham et al. | 264/284 |
| 4,123,946 | 11/1978 | Holloway, Jr. | 74/231 P |
| 4,260,578 | 4/1981 | Moody | 264/210.2 |

Primary Examiner—Marion McCamish
Attorney, Agent, or Firm—Joseph V. Tassone

[57] ABSTRACT

A method and apparatus for making toothed belts and toothed belt made using such method and apparatus are provided wherein the belt is made primarily of polymeric material and is comprised of at least parts of a plurality of successive turns of a single helically wound toothed strip wherein the turns are bonded together in adjoining side-by-side relation and the toothed belt has improved teeth comprised of teeth initially provided in the single toothed strip by compressed, displaced, and reshaped portions of hot strip means of substantially self-supporting quadrilateral cross-sectional configuration employed to define such single strip.

26 Claims, 14 Drawing Figures

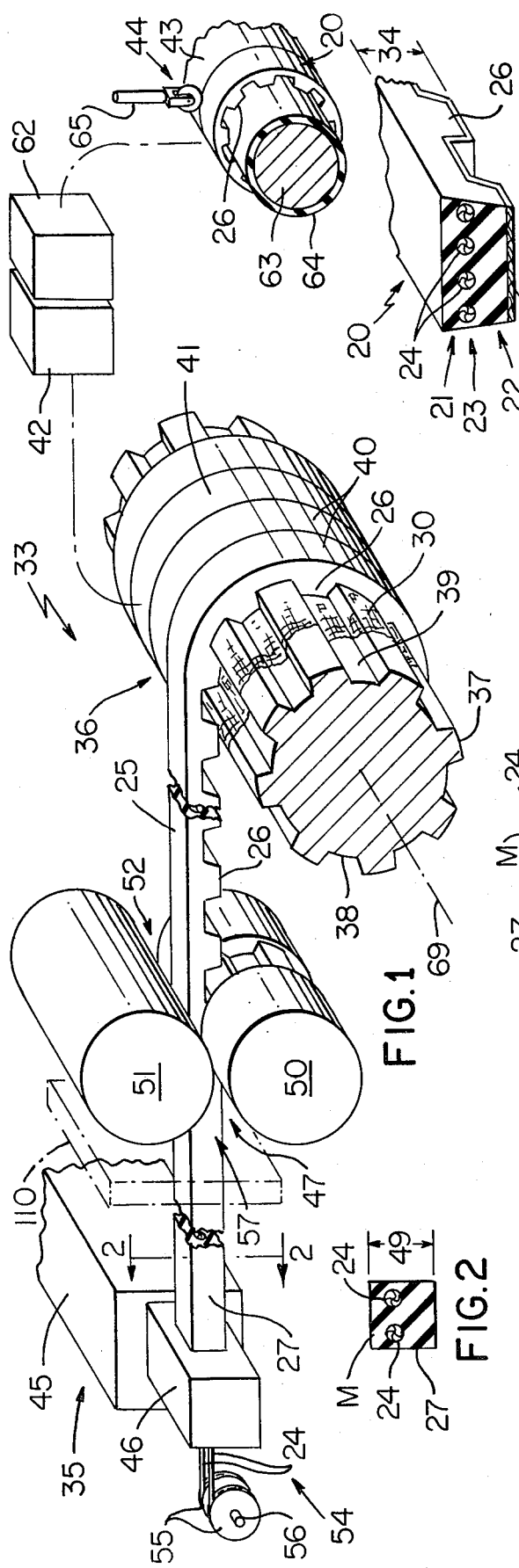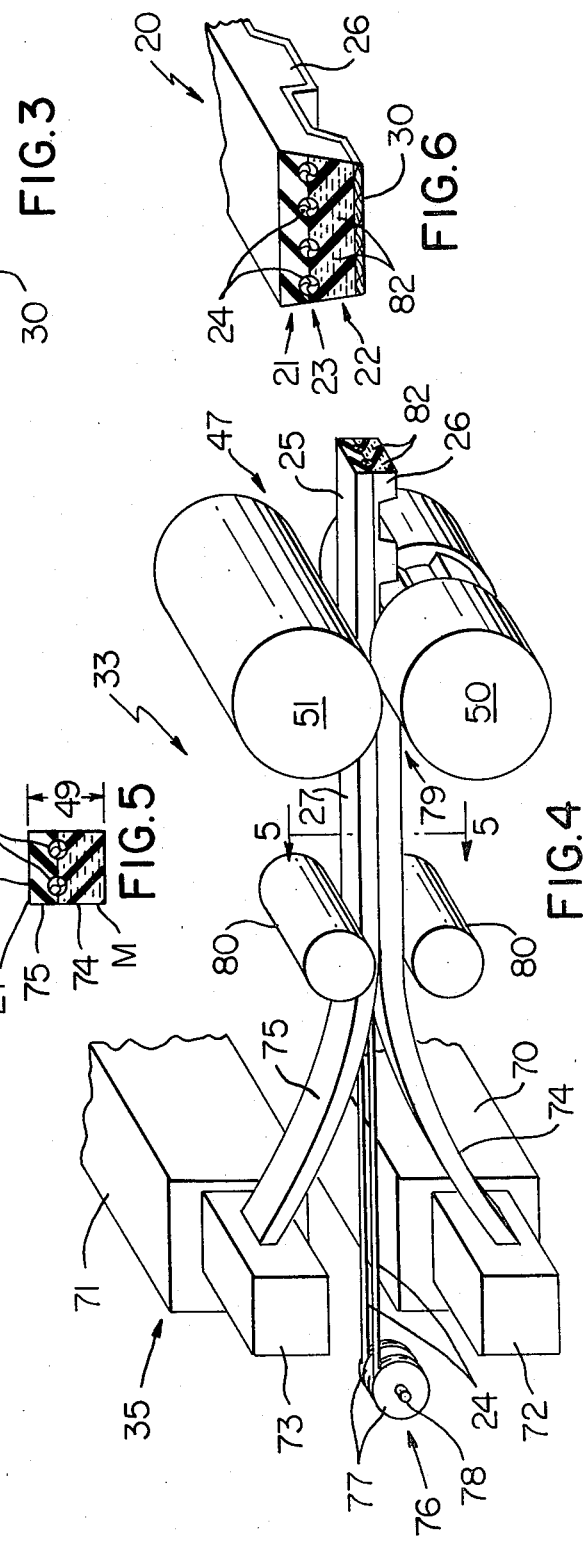

METHOD AND APPARATUS FOR MAKING TOOTHED BELTS AND BELT MADE EMPLOYING SAME

CROSS REFERENCE TO RELATED APPLICATION

This application is a continuation patent application of its copending parent patent application, Ser. No. 205,832 filed Nov. 10, 1980, and now abandoned in favor of this continuation application.

BACKGROUND OF THE INVENTION

1. Field of the Invention

This invention relates to polymeric toothed endless power transmission belts and to an improved method and apparatus for making same.

2. Prior Art Statement

Toothed endless power transmission belts made primarily of polymeric material are well known in the art and two commonly used types of such belts are so-called cog-type belts and synchronous belts. In cog-type belts teeth are provided in each belt for the main purposes of improved belt flexibility and controlled transverse rigidity. In synchronous belts each belt has alternating teeth and grooves which mesh with cooperating grooves and teeth respectively of cooperating toothed pulleys for the purpose of transmitting rotational forces.

However, regardless of the type of toothed endless power transmission belt, it is important that the teeth formed for endless belts (and particularly those made primarily of rubber) be formed with precision yet in an economical manner.

It has been proposed in U.S. Pat. No. 3,999,914 to provide a continuous reinforced toothed strip made of elastomeric or synthetic material such as polyurethane or polyamide or similar extruding material and such toothed strip is made by injecting the material into an arc-shaped mold defined by a rotating toothed wheel converted by a steel band.

It has also been proposed in U.S. Pat. No. 4,083,838 to wind a prefabricated continuous reinforced toothed strip made of polyurethane, polyamide, and the like, and of the type disclosed in U.S. Pat. No. 3,999,914 employing a special apparatus and method to define a so-called reinforced tube by heating and fusing adjoining portions of the toothed strip being wound and utilizing such tube for the purpose of cutting endless toothed belts therefrom.

It has also been disclosed in U.S. Pat. No. 4,123,946 to extrude a plain strip of polymeric material having load-carrying means extending throughout the length of the strip, wind such strip in a helical pattern on a drum, and cure the wound strip to form a belt sleeve which is without teeth and has smooth right circular cylindrical inside and outside surfaces. The belt sleeve is then cut to define endless belts. The plain strip of polymeric material may be rubber or a thermoplastic material and the polymeric material may have fibers embedded therein in a random manner.

It has also been proposed in U.S. patent application Ser. No. 034,698, filed Apr. 30, 1970 to make a long synchronous belt by forming a first toothed belt sleeve on a toothed cylinder, cutting the first belt sleeve in a helical pattern to define a toothed strip of extended length, winding the toothed strip on toothed cylinder means to form a second toothed belt sleeve, and then cutting the second sleeve to define toothed endless belts.

SUMMARY

It is a feature of this invention to provide a method of making toothed endless power transmission belts employing an elongate toothed belt element made of polymeric material wherein the toothed belt element is made in a simple and economical manner.

Another feature of this invention is to provide a method of the character mentioned particularly adapted for making toothed endless belts made primarily of self-supporting hot strip means of uncured rubber.

Another feature of this invention is to provide a method of making toothed endless power transmission belts of the character mentioned wherein each belt has a particular thickness and comprising the steps of, forming a polymeric material to define an elongate toothed belt element, helically wrapping the toothed belt element on cylinder means with successive helical turns in adjoining side-by-side relation and with each tooth of each turn in substantial axial alignment with associated teeth of other helical turns, bonding the adjoining helical turns together to define a toothed belt sleeve, cutting the sleeve to define a plurality of toothed belts and wherein the forming step comprises the steps of defining hot strip means of the polymeric material with the strip means having an overall substantially self-supporting quadrilateral cross-sectional configuration and a thickness roughly equal to the particular thickness, and working the strip means to define the toothed belt element.

Another feature of this invention is to provide a method of the character mentioned in which the working step comprises working the strip between the nip of a pair of working rollers defined by a toothed forming roller and a backup roller.

Another feature of this invention is to provide a method of the character mentioned in which the step of working the strip means comprises compressing, displacing, and reshaping portions of the strip means between the nip of the toothed forming roller and the backup roller to define the toothed belt element.

Another feature of this invention is to provide a method of the character mentioned in which the defining step comprises defining the hot strip means by extruding same from an extruder.

Another feature of this invention is to provide a method of the character mentioned and comprising the further step of disposing load-carrying means in the form of at least one elongate flexible member in the hot strip means and wherein the flexible member comprises corresponding helically wound load-carrying means in the endless belts defined from the toothed belt sleeve.

Another feature of this invention is to provide a method of the character mentioned in which the disposing step comprises coextruding the elongate flexible member through an extrusion die simultaneously with the extrusion of the hot strip means to define the strip means and simultaneously embed the flexible member axially therealong.

Another feature of this invention is to provide a belt of the character mentioned wherein the defining step comprises defining the hot strip means in the form of a single hot strip and the disposing step comprises disposing a flexible member axially along and within the single strip prior to the working step.

Another feature of this invention is to provide a method of the character mentioned in which the disposing step comprises slitting the single strip after defining same along its axial length to define at least one slit having a bottom and urging the flexible member into the slit to position same along such bottom.

Another feature of this invention is to provide a method of the character mentioned in which the defining step comprises defining the hot strip means of a plurality of hot strips each having a substantially quadrilateral cross-sectional configuration and with the disposing step comprising laminating the elongate member between an adjoining pair of the hot strips prior to the working step.

Another feature of this invention is to provide a method of the character mentioned comprising the further step of laminating fabric means against the surface of the strip means prior to the working step.

Another feature of this invention is to provide a method of the character mentioned and comprising the further step of embedding a plurality of discrete fibers in the polymeric material defining the strip means to provide corresponding fibers in the belts made from such strip means with the fibers providing reinforcement for such belts.

Another feature of this invention is to provide an improved apparatus for making a polymeric toothed endless power transmission belt.

Another feature of this invention is to provide an improved toothed endless power transmission belt made primarily of polymeric material and having improved teeth.

Therefore, it is an object of this invention to provide an improved method and apparatus for making a polymeric toothed endless power transmission belt, and an improved belt employing such method and apparatus, having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in elevation, parts in cross section, parts shown schematically, and parts broken away illustrating one exemplary embodiment of the method and apparatus of this invention which may be used in making one embodiment of an endless toothed belt made primarily of rubber;

FIG. 2 is a cross-sectional view taken essentially on the line 2—2 of FIG. 1;

FIG. 3 is a fragmentary perspective view of the belt made employing the method and apparatus of FIG. 1;

FIG. 4 is a view illustrating a modification of the method and apparatus of FIG. 1 wherein only initial method steps and associated apparatus are different from the method and apparatus of FIG. 1;

FIG. 5 is a cross-sectional view similar to FIG. 2 and taken on the line 5—5 of FIG. 4;

FIG. 6 is a fragmentary perspective view similar to FIG. 3 and illustrating the toothed belt made employing the modified method and apparatus of FIG. 4;

DETAILED DESCRIPTION

Figure 7:
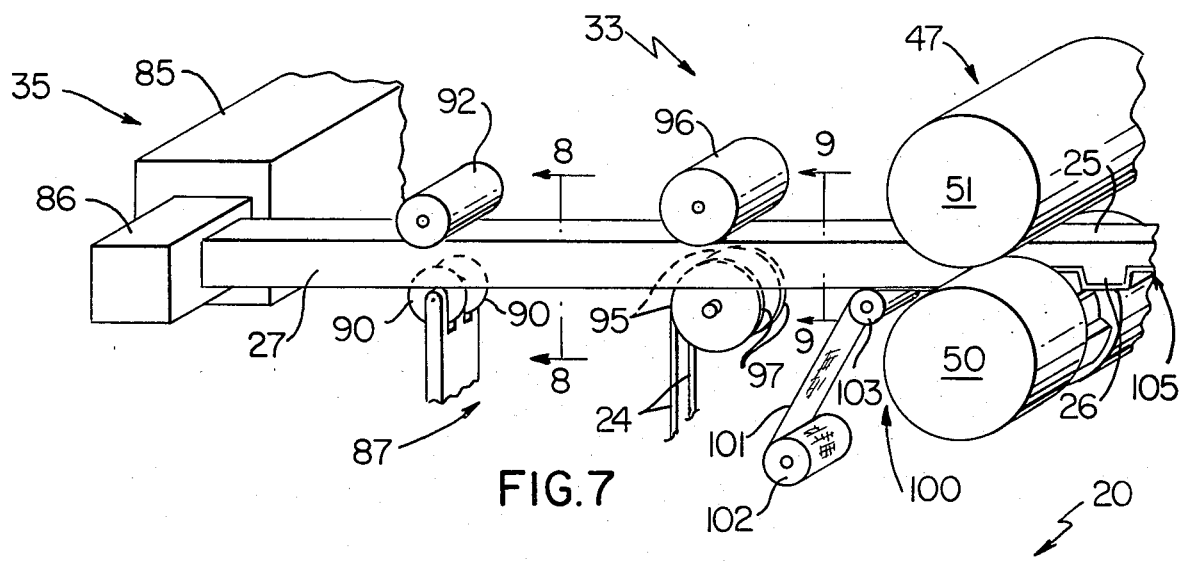
FIG. 7 is a view illustrating another modification of the method and apparatus of FIG. 1 wherein again only initial method steps and associated apparatus are different from the method and apparatus of FIG. 2.

Reference is now made to FIG. 3 of the drawings which illustrates an exemplary embodiment of an endless toothed power transmission belt made in accordance with the teachings of this invention and such belt is designated generally by the reference numeral 20. The belt 20 is made primarily of polymeric material and preferably of suitable rubber material (whether natural or synthetic rubber): and, such belt comprises a tension section 21, a compression section 22, and a load-carrying section 23 comprised of at least one and in this example a pair of helically wound elongate flexible members or load-carrying cords, each designated by the same reference numeral 24.

The belt 20 is comprised of at least part of a plurality of successive turns of a single helically wound toothed belt element, shown as a toothed element or strip 25 in FIG. 1, and wherein the turns are bonded together in adjoining side-by-side relation whereby the interfaces of adjoining turns are not discernible and the bonding action will be described subsequently. The belt 20 has spaced teeth 26 provided with a particular pitch therebetween with such teeth 26 having been initially provided in strip 25 by compressed, displaced, and reshaped portions of uncured rubber strip means in the form of a single strip 27 of quadrilateral cross-sectional configuration and used to define the single toothed strip 25. The teeth 26 in the belt 20 comprise the compression section 22 and the belt 20 has fabric means or a fabric cover layer 30 defining its inside surface. The manner in which the cover 30 is provided to define the inside surface of belt 20 will be described subsequently.

The belt 20 is made utilizing the method and apparatus of this invention and such method and apparatus is illustrated in FIG. 1 and designated generally by the reference numeral 33. The detailed description will now proceed with a general description of apparatus 33 followed by a more detailed description of certain features of the apparatus.

The apparatus 33 is particularly adapted for making toothed endless power transmission belts of rubber wherein each belt has a particular thickness 34 (FIG. 3) exclusive of its cover 30. The apparatus 33 comprises means for forming polymeric material to define an elongate toothed belt element 25 and such forming means is designated generally by the reference numeral 35. The apparatus also includes means 36 for helically wrapping the toothed belt element on cylinder means or a toothed cylinder 37 (having alternating projections or teeth 38 and grooves 39) with successive helical turns 40 in adjoining side-by-side relation and with each tooth of each turn in substantial axial alignment with associated teeth of other helical turns, and as illustrated in FIG. 1.

The helical turns 40 cooperate to define a tubular construction 41. The apparatus 33 also comprises a device 42 (indicated schematically) for bonding the adjoining helical turns 40 together to define a toothed belt sleeve 43 and such apparatus also comprises a cutting apparatus 44 for cutting the sleeve 43 to define a plurality of the toothed belts 20. A typical belt 20 was described previously in connection with FIG. 3.

The forming means 35 of the apparatus 33 is in accordance with the teachings of this invention and such forming means comprises means defining hot strip means or a hot strip 27 of polymeric material M which is presented in this example as a hot strip of uncured rubber M having a substantially self-supporting quadrilateral cross-sectional configuration. The rectangular strip 27 has a thickness 49 which is roughly equal to the thickness 34 of the belt 20 and the means defining the strip 27 comprises a conventional extruder 45 which has an extrusion die 46 which is used in extruding the hot strip 27 of uncured rubber therefrom.

The forming means 35 also comprises means 47 for working the hot strip 27 to define the toothed belt strip or element 25 and such working means comprises cooperating working rollers 47 consisting of a toothed forming roller 50 and a backup roller 51. The rollers 50 and 51 cooperate to work the hot extruded strip 27 between the nip shown at 52 of the rollers 50–51.

The apparatus 33 also comprises means 54 for disposing at least one elongate flexible load-carrying member in the hot uncured rubber strip 27 to define a corresponding load-carrying member in the endless belts. In this example two of such elongate members are disposed in the strip 27 and each is designated by the same reference numeral 24 as in the completed toothed belt 20 of FIG. 3.

The disposing means 54 of this example comprises means for feeding the flexible members 24 into the extrusion die 46 simultaneously with the feeding of the polymeric material M in a flowable condition from the extruder 45 whereby the strip 27 is defined and simultaneously the flexible members are embedded axially therealong. The disposing means 54 comprises a pair of supply spools 55 supported on a common shaft 56 for unwinding rotation. The flexible members or load-carrying cords 24 are carried on their spools and the leading ends thereof introduced into the extrusion die 46 at controlled positions so that as the polymeric material M is introduced through such die the members 24 are unwound from their spools and embedded in position in the hot strip 27 as it is formed in the die 46.

As indicated earlier, the hot uncured strip 27 is worked by the working rollers 47 and such rollers cooperate to work a lower portion 57 of the strip 27, as shown in FIG. 1, along its entire length while keeping the flexible members 24 substantially intact. The toothed belt element 25 thus defined has the flexible members 24 extending in a rectilinear path along its full axial length.

As previously mentioned, the bonding device 42 of the apparatus 33 bonds the adjoining helical turns 40 together to define the toothed belt sleeve 43. The bonding device 42 is of a type well known in the art and utilizes steam under controlled temperature and pressure together with a collapsible rubber sleeve which is disposed around the helically wound tubular construction 41 while it is wrapped around the toothed cylinder 37 to provide bonding of the adjoining helical turns 40 defining belt sleeve 43 and simultaneously therewith provide curing of such sleeve. The belt sleeve 43 thus defined has a homogeneous construction throughout the polymeric material (rubber) defining same whereby the usual interfaces between adjoining turns 40 are obliterated and hence nonexistent in the completed belts 20.

The cured sleeve 43 and its supporting toothed cylinder 37 are cooled in a suitable cooling apparatus 62 which is shown schematically. The cooling apparatus may employ any suitable cooling medium including ambient air, or a suitable cooling liquid such as ordinary tap water. After cooling, the sleeve 43 is stripped from its supporting cylinder 37 using stripping apparatus and techniques which are known in the art.

The sleeve 43 is then disposed around a cutting mandrel 63 which comprises the cutting apparatus 44. The mandrel 63 is suitably supported for rotation on centers thereof and may be provided with an outer cutting mat 64 to protect the main portion of the mandrel as well as prevent damage to a cutter 65 which comprises the cutting apparatus 44 and is used to cut a plurality of endless power transmission belts 20 of FIG. 3 from the sleeve 43. Each endless toothed belt 20 cut from sleeve 43 is comprised of at least parts of a plurality of successive turns of the single helically wound toothed strip 25 as is known in the art. Further, as indicated earlier, such parts of plurality of turns are not discernable individually due to flow and bonding of polymeric material during curing of helical turns 40 to define sleeve 43.

The toothed strip 25 of this disclosure is helically wound around toothed cylinder means or cylinder 37 over which fabric means in the form of a single layer of fabric 30 has been disposed (FIG. 1), and, the manner in which the fabric 30 is disposed around cylinder 37 is well known in the art and will not be described herein. Further, during the process of bonding the adjoining helical turns 40 and curing the resulting belt defining sleeve 43 the fabric material 30 is simultaneously bonded in position to define the toothed inside surface of the sleeve 43 and thus the fabric inside surface of each belt.

As described earlier the cooperating rollers 50 and 51 defining the working means 47 work the strip 27 to define teeth therein (also designated by the reference numeral 26 in the toothed strip) and such teeth are disposed perpendicularly to the longitudinal axis of the toothed strip 25. The strip 25 is then helically wrapped around cylinder 37 with the teeth 26 of each helical turn being disposed in the same axial groove 39 and against fabric layer 30 as associated teeth of other helical turns to provide a basic axial alignment of teeth along the central longitudinal axis 69 of the cylinder 37. However, during curing and bonding in the device 42 the teeth 26 are redefined and reshaped and teeth in the turns 40 bond together as a homogeneous mass to define teeth in the sleeve 43 which are also designated by the reference numeral 26. Each tooth 26 in the sleeve 43 and hence in each belt 20 has a sharp and precise final tooth form yet such final tooth form is provided comparatively economically.

It will also be appreciated that in some applications of this invention it may be preferred to wind the toothed strip 25 on toothed cylinder means in the form of a toothed cylinder 37 without interposing fabric layer 30 therebetween whereby the resulting endless belts 20 would be minus a fabric cover layer on their inside surfaces.

The apparatus of FIG. 1 is particularly adapted in carrying out the method of this invention in making toothed endless power transmission belts each having a particular thickness 34, as shown in FIG. 3. The basic method steps comprise forming the polymeric material M to define an elongate toothed belt element 25. The toothed belt element is then helically wrapped on cylinder means or a cylinder 37 with successive helical turns in adjoining side-by-side relation and with each tooth of each turn in substantial axial alignment with associated teeth of other helical turns to define an overall tubular construction 41. The adjoining helical turns of the tubular construction 41 are then bonded in a bonding device 42 to define a toothed belt sleeve 43 and such sleeve is then suitably cooled in cooling apparatus 62. The belt sleeve 43 is then cut employing a cutting apparatus 44 to define a plurality of toothed belts.

In accordance with the teachings of this invention the forming step comprises defining strip means 27 in the form of hot strip means (preferably of rubber) and the heating of such hot strip means in this disclosure is produced by extrusion process. The strip means has an overall substantially quadrilateral cross-sectional configuration and a thickness which is roughly equal to the overall thickness 34 of the completed belt. The strip means 27 is then worked in accordance with the teachings of this invention utilizing cooperating working rollers 47 to define a toothed belt element 25 having teeth 26. The working of hot strip means 27 comprises compressing, displacing, and reshaping of portions of the strip means 27 between the nip 52 of the working rollers 47.

Reference is now made to FIG. 4 of the drawings which illustrates a modification of the method and apparatus 33 which is basically identical to the method and apparatus of FIG. 1 with the exception of forming means thereof upstream of working rollers 47, which is the main illustration of FIG. 4, and such forming means is also designated by the reference numeral 35. For ease of presentation the apparatus and method of FIG. 4 is also designated by the reference numeral 33. The forming means 35 of FIG. 4 comprises a plurality of extruders shown as extruders 70 and 71 having extrusion dies 72 and 73 respectively. The extruder 70 and its die 72 define an associated hot polymeric strip 74 while the extruder 71 and its die 73 define an associated hot polymeric strip 75 and each of these strips 74 and 75 is comprised of polymeric material in the form of rubber M and has a substantially self-supporting quadrilateral (rectangular) cross-sectional configuration. The strips 74–75 are laminated together to define hot strip means 27.

The apparatus and method of FIG. 4 also has disposing means 76 for disposing flexible members or cords 24 within the hot strip means 27 and such disposing means comprises a pair of spools 77 each carrying a cord 24. The spools 77 are supported for unwinding rotation on a common shaft 78. The apparatus 33 of FIG. 4 also has laminating means in the form of a pair of laminating rollers each designated by the same reference numeral 80 which laminate the hot strips 74 and 75 with the cords 24 sandwiched and laminated therebetween prior to movement thereof through the working rollers 47 to define the hot strip means 27 as a laminated construction which also has an overall substantially self-supporting quadrilateral cross-sectional configuration and a thickness 49 roughly equal to the thickness 49 of the one piece strip illustrated in FIG. 2. The laminated construction or hot strip means 27 of FIG. 4 is then introduced into the working rollers 47 as shown at 79 and such rollers work the lower portion thereof, which is comprised primarily of the hot strip 74, along its entire length while keeping the flexible members or cords 24 substantially intact to define the toothed belt element 25.

The strip 74 has discrete randomly arranged or disposed fibers 82 embedded therein with the polymeric material M serving as a matrix therefor (FIG. 5). The fibers may be made of any suitable material and are preferably nonmetallic organic fibers having a diameter ranging between 0.001 inch and 0.050 inch and a length ranging between 0.001 inch and several inches. The fibers 82 may be made of any suitable organic material including but not being limited to nylon, cotton, polyester and rayon or may be made of blends or mixtures of these materials. The fibers are preferably mixed in the polymeric material in their extruder 70 and such fibers may be suitably oriented, employing known means, so that the fibers have the desired orientation in their strip 74.

The strip 25 is further processed, as previously described in connection with FIG. 1, to define the belt of FIG. 6 which is also designated by the reference numeral 20. The belt 20 has tension section 21, compression section 22, and load-carrying section 23 defined by the helically wound cords 24. Further, the compression section 22 is loaded with fibers 82 and has fabric layer 30 comprising same.

Reference is now made to FIG. 7 of the drawings which illustrates another modification of the method and apparatus of this invention. As in the case of the FIG. 4 presentation, in the modification of FIG. 7 the entire method and apparatus downstream of the cooperating working rollers 47 and including such working rollers is identical to the method and apparatus previously described in connection with FIG. 1. The main difference between the method and apparatus of FIG. 7 and the method and apparatus of FIG. 1 is in the forming means upstream of the working rollers 47.

Figure 8:
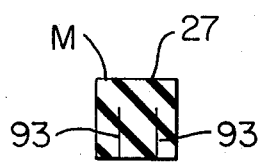
FIG. 8 is a cross-sectional view taken on the line 8—8 of FIG. 7.

The forming means 35 of FIG. 7 comprises an extruder 85 for extruding polymeric material M and the extruder 85 has an extrusion die 86 which serves to extrude a single hot strip of polymeric material which, as shown in FIG. 8, also has an overall substantially self-supporting quadrilateral (rectangular) cross-sectional configuration. The forming means of FIG. 7 includes disposing means 87 for disposing a plurality of flexible members or load-carrying cords 24 axially along and within the single strip 27 prior to movement thereof through the cooperating working rollers 47.

The disposing means 87 comprises means for slitting the single strip 27 along its axial length and in this example such slitting means comprises a pair of rotary cutters 90 which are supported on a supporting structure 91. The cutters 90 are adapted to be moved toward and away from the hot polymeric strip 27 after extruding thereof from the extrusion die 86 and such cutters may be power driven. The cutters 90 cooperate with a backup roller 92 to provide an efficient cutting action and a pair of slits 93 (FIG. 8) in the strip 27.

Figure 9:
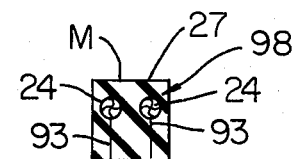
FIG. 9 is a cross-sectional view similar to FIG. 2 and taken on the line 9—9 of FIG. 7.

Disposing means 87 also comprises means for urging the flexible members or cords 24 into the slits 93 and such urging means comprises a pair of grooved discs each designated by the same reference numeral 95 and a cooperating backup roller 96. The grooved discs 95 have semitoroidal grooves 97 defining their outer periphery and serve to urge flexible members 24 (supplied from suitable spools thereof and not shown) into the slits 93 to position each flexible member along the bottom of its associated slit 93 and as shown at 98 in FIG. 9. As the leading end portions of the flexible members or cords 24 are introduced into the hot polymeric strip by discs 95 and with continuous extrusion of the self-supporting extruded strip, portions of the strip 27 adjoining the slits serve to, in essence, grasp and unwind the cords 24 from their spools with continuous movement of strip 27 towards the working rollers 47. Further, once the flexible members 24 are introduced by the discs 95 and backup roller 96 in the bottoms of the slits 93 the normal tendency of the strip 27 is to return to its original unslitted configuration closing the slits at their entrances as shown at 99 in FIG. 9. However, it will be appreciated that, if desired, a pair of side rollers (not shown) may be utilized to close the open ends of the slits 93 downstream of the urging discs 95.

The apparatus 33 of FIG. 7 also has bonding means 100 for bonding fabric means in the form of a fabric layer 101 against a surface shown as a bottom surface of the strip means 27 prior to movement thereof through the working rollers 47. The fabric layer 101 is basically a ribbon of fabric supplied from a roll 102 thereof which is supported for unwinding rotation. The layer or ribbon 101 is laminated in position by a laminating roller 103 which urges the ribbon against the underside of the polymeric strip 27. Strip 27 of FIG. 7 with the fabric ribbon 101 laminated thereagainst is then moved through the working rollers 47.

The working rollers 47 cooperate to work the lower portion of the strip 27 as described previously while keeping the flexible members 24 substantially intact, and also keeping such members in a rectilinear or straight configuration the full length of the strip. The fabric ribbon 101 is simultaneously disposed in an undulating path by the working rollers. The undulating configuration of the fabric ribbon or layer 101 defines an exposed surface of the toothed belt element 25 of FIG. 7 as shown at 105 which is then further processed in a similar manner as described in connection with FIG. 1. Accordingly, the fabric covered toothed belt element 25 is wrapped on cylinder 37 after disposing the fabric cover 30 therearound.

Figure 10:
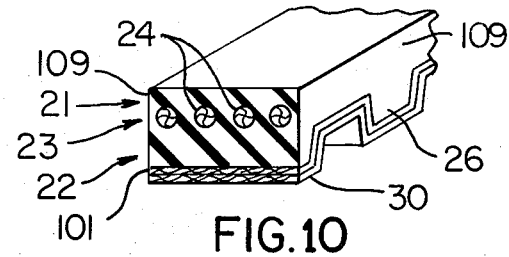
FIG. 10 is a fragmentary perspective view similar to FIG. 3 and illustrating the toothed belt made employing the method and apparatus of FIG. 7.

A typical endless toothed belt 20 defined utilizing the modified apparatus and method of FIG. 7 is shown in FIG. 10 and has a double layer of fabric means comprised of inner layer 101 and outer fabric layer 30. The belt 20 of FIG. 10 is defined and cut as a synchronous belt and also has tension section 21, compression section 22, and load-carrying section 23, whereby it will be noted that this belt has opposed sides each designated by the same reference numeral 109 which are disposed in parallel relation.

Figure 11:
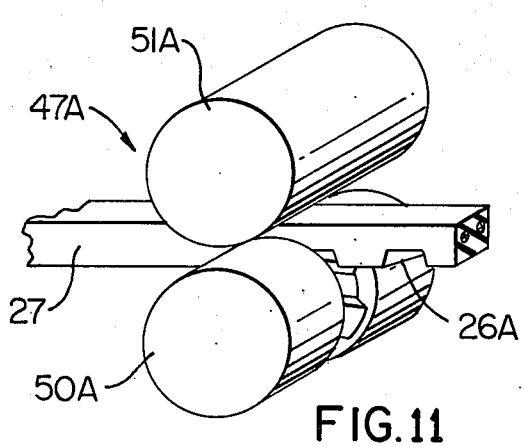
FIG. 11 is a fragmentary perspective view illustrating a modified form of cooperating working rollers which may be utilized in the method of FIG. 1, FIG. 4, or FIG. 7 interchangeably with the working rollers illustrated to define teeth in the elongate toothed belt element having teeth at a skew angle relative to the longitudinal axis of the toothed element.
Figure 13:
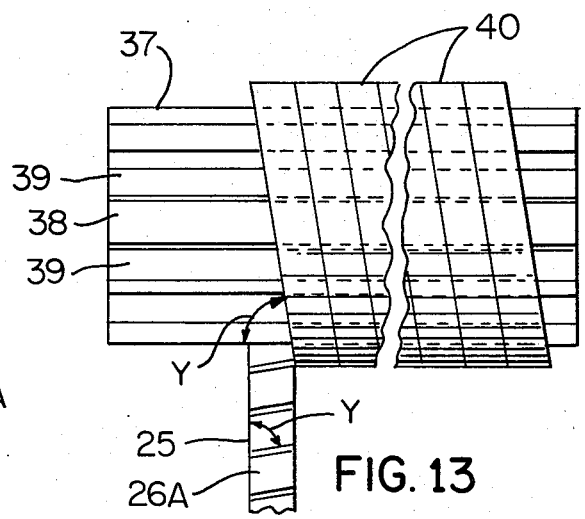
FIG. 13 is a fragmentary view, primarily schematic, illustrating the manner in which the belt element of FIG. 12 with its skewed teeth is helically wrapped around a toothed cylinder whereby each tooth of each turn is disposed in the same axial groove of the cylinder as associated teeth of the other associated helical turns to provide a substantially perfect axial alignment of the teeth in the toothed cylinder.
Figure 12:
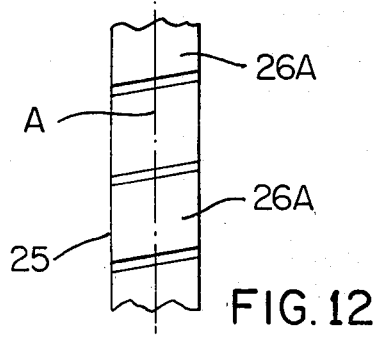
FIG. 12 is a view looking perpendicularly toward the skewed teeth defined by the rollers of FIG. 11.

The working rollers 47 defined by toothed forming roller 50 and backup roller 51 cooperate to define teeth in which each tooth has a symmetrical body and a central axis which is disposed perpendicular to the longitudinal axis A of its toothed belt element or strip 25. However, modified working rollers 47A are illustrated in FIG. 11 and such rollers comprise a toothed forming roller 50A and a backup roller 51A. The forming roller 50A has skewed teeth and is such that it defines teeth 26A in hot strip means which are disposed at an skew angle Y with respect to the longitudinal axis A its strip and toothed belt element also designated by the reference numeral 25 defined thereby, and as illustrated in FIG. 12. The toothed belt element 25 of FIG. 12 may be helically wrapped around cylinder means such as the toothed cylinder 37 as shown in FIG. 13 whereby each tooth 26A of each helical turn 40 is disposed in the same axial groove 39 as associated teeth of other helical turns to provide substantially perfect axial alignment of the teeth 26A. It will also be appreciated that the modified working rollers 47A define individual teeth in the toothed belt 25 with a pitch between teeth which corresponds to the pitch of the grooves 39 in the cylinder 37 while defining each of the teeth at the skew angle Y. The skew angle Y corresponds to the helix angle (also designated Y) of the strip 25 as it is wrapped around the cylinder (FIG. 13) whereby each tooth 26A is disposed in the same axial groove 39 as associated teeth of other helical turns 40 to provide the previously mentioned substantially perfect alignment. With this substantially perfect alignment of the teeth it will be appreciated that during the curing and simultaneous bonding of adjoining helical turns 40 the resulting belt sleeve 43 and belts 20 will have substantially perfectly formed teeth.

In some applications of this invention it may be desired to define toothed belts 20 essentially as described earlier, but with another layer of polymeric material, such as rubber, defining the outer portion of the tension section of each belt. This is preferably achieved following the step of helically wrapping the strip 25 around the toothed cylinder 37 by merely wrapping an outer layer of rubber concentrically around the helical turns 40. This outer layer may be wrapped in position using any technique known in the art to define a modified tubular construction which is similar to tubular construction 41 of FIG. 1. This modified tubular cnstruction is then processed as described previously to define a modified belt 20 as shown in FIG. 14.

Figure 14:
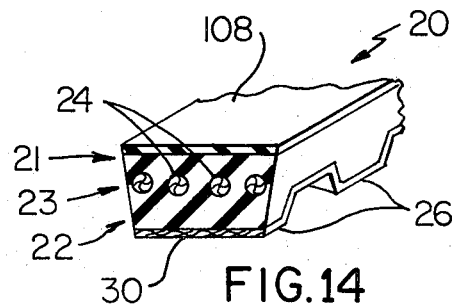
FIG. 14 is a fragmentary perspective view illustrating another embodiment of a toothed endless power transmission belt made employing a modified method and apparatus of FIG. 1.

The belt 20 of FIG. 14 has the usual tension section 21, compression section 22, load-carrying section 23 comprised of the helically wound load carrying cords 24, and fabric inside layer 30. In addition, this belt has an outer rubber layer 108 defining the outer portion of the tension section 21 and overall belt 20. The rubber layer may serve to impart special properties to the belt.

Two layers of fabric are shown defining the inside portion of belt 20 of FIG. 10. However, it will be appreciated that a single layer of fabric may be provided for this belt or an additional number of layers may be provided. Similarly, the belts illustrated in FIGS. 3, 6, and 14 may have a single fabric layer, as shown, or a plurality of fabric layers, as desired.

In this disclosure of the invention discrete fibers 82 are shown in connection with the endless toothed belt 20 of FIG. 6. However, it will be appreciated that fibers 82 may be provided to define other portions of each of the belts disclosed herein. For example, fibers 82 may comprise the tension section 21 or both the tension section 21 and the compression section 22. It will also be appreciated that randomly disposed fibers 82 may be provided in any of the belts using the techniques described in connection with the belt 20 of FIG. 6.

In this disclosure of the invention the hot uncured rubber strip means 27, whether in the form of a single hot strip or a plurality of laminated strips, is defined basically by extrusion process with heating thereof being provided by extrusion apparatus. However, it will be appreciated that other known means and techniques may be employed to define hot strip means and to heat same. In addition heating may be provided or supplemented and controlled by heating device 110 which is shown by dot dash lines in FIG. 1. Nevertheless, regardless of how hot strip means 27 is provided such strip means, before working thereof, has an overall substantially self-supporting quadrilateral cross-sectional configuration i.e. it is not in the form of a molten mass which must be contained to retain its form. Further, during the working of such strip means by working means 47 the self-supporting configuration is compressed, displaced, and reshaped as described herein whereby the toothed strip or element 25 is defined with comparatively great economy.

The working rollers 47 comprised of toothed roller 50 and backup roller 51 may be suitably controlled in temperature at their surfaces using techniques known in the art to assure working of the hot uncured strip means 27 to define the toothed belt element 25 with minimum tendancy for the rollers 50 and 51 to stick or adhere to the rubber material M being worked.

The method and apparatus of this invention is particularly adapted to be used in defining toothed endless power transmission belts whether of the so-called cog type or synchronous type belts and such method is primarily applicable in defining belts made of polymeric material in the form of rubber, whether natural or synthetic rubber. However, the apparatus and method of this invention may be utilized to define belts made of other polymeric material, if desired.

In this disclosure two flexible members or cords 24 have been embedded in strip means 27 prior to working thereof. However, it will be appreciated that any desired number of members may be embedded as desired. Further, such cords 24 may be made of any material used in the art as a load-carrying member for a belt.

The method of this invention may be practiced in a substantially continuous process, except for interruption for curing purposes and the cooling and cutting steps following curing.

The method of this invention also lends itself to defining strip means 27 of uncured polymer, such as rubber, storing such uncured strip means 27 on supply rolls thereof and then working the strip using working means 47 at a later time and at any location remote from where the strip is defined. The working of the strip 27 with this procedure is carried out after heating thereof in heating device 110. This last mentioned procedure and the procedure of the method described herein including all modifications of such method are possible due to the self-supporting character of the uncured rubber strip means.

In the description presented above in connection with FIG. 7 a fabric ribbon 101 having the width of its strip 27 is bonded in position on strip 27 to define a corresponding fabric layer on the fabric covered toothed strip 25 and belt sleeve and belts defined therefrom. However, it will be appreciated that the ribbon 101 may have a width which is twice (or more) greater than the width of its strip 27 so that when its associated toothed strip is wrapped on cylinder 37 and cured a plurality of fabric thicknesses define the inner portion of the cured belt sleeve defined therefrom and hence the belts made from such sleeve.

In the description presented above, it will be appreciated that the toothed strip 25 is wound onto the cylinder 37 under a controlled tension.

While present exemplary embodiments of this invention have been illustrated and described it will be recognized that this invention may be otherwise variously embodied and practiced within the scope of the following claims.

What is claimed is:

1. In a method of making toothed endless power transmission belts each having a particular thickness and comprising the steps of, forming a polymeric material to define an elongate toothed belt element, helically wrapping said toothed belt element on cylinder means with successive helical turns in adjoining side-by-side relation and with each tooth of each turn in substantial axial alignment with associated teeth of other helical turns, bonding said adjoining helical turns together to define a toothed belt sleeve, and cutting said sleeve to define a plurality of said toothed belts, the improvement wherein said forming step comprises the steps of defining hot strip means of said polymeric material with said strip means having an overall substantially self-supporting quadrilateral cross-sectional configuration throughout the length thereof and a thickness throughout the length thereof roughly equal to said particular thickness, disposing load-carrying means in said hot strip means with said load-carrying means comprising at least one elongate flexible member that forms a corresponding helically wound load-carrying means in said endless belts, and thereafter working said self-supporting quadrilateral cross-sectional configured strip means to define said toothed belt element with a thickness at the teeth thereof roughly equal to said particular thickness and prior to said step of helically wrapping said toothed belt element on said cylinder means, said disposing step comprising the step of disposing said flexible member axially along and within said hot strip means prior to said working step so that said hot strip means engages said flexible member substantially completely around the same throughout substantially the entire length thereof that is disposed within said hot strip means, said working step comprising the step of working a portion of said hot strip means along its entire length while keeping said flexible member substantially intact to define said toothed belt element having said flexible member extending in a rectilinear path along its full length.

2. A method as set forth in claim 1 in which, said defining step comprises defining strip means of said polymeric material in the form of an uncured polymeric material, said working step comprises working said strip means between the nip of a toothed forming roller and a backup roller, said bonding step comprises subjecting said adjoining helical turns to a curing environment to provide said bonding and simultaneously therewith provide curing of said sleeve, and comprising the further step of cooling said sleeve prior to said cutting step.

3. A method as set forth in claim 2 in which said step of working said strip means comprises compressing, displacing, and reshaping portions of said strip means between said nip to define said toothed belt element.

4. A method as set forth in claim 3 in which said defining step comprises defining said hot strip means of rubber, and said helically wrapping step comprises helically wrapping said toothed belt element on said cylinder means in the form of toothed cylinder means defined by alternating projections and grooves in said toothed cylinder means with each tooth of each helical turn being disposed in the same axial groove as said associated teeth of said other helical turns to provide said substantial axial alignment.

5. A method as set forth in claim 4 in which said defining step comprises defining said hot strip means by extruding same from extruder means.

6. A method as set forth in claim 4 in which said defining step comprises defining said hot strip means of said rubber by extrusion thereof.

7. A method as set forth in claim 4 in which said defining step comprises defining said hot strip means consisting of a single hot strip.

8. A method as set forth in claim 7 in which said disposing step comprises slitting said single strip along its axial length to define a slit having a bottom and urging said flexible member into said slit to position same along said bottom.

9. A method as set forth in claim 7 and including the step of feeding said toothed belt element directly from said nip to said cylinder means under a controlled tension.

10. A method as set forth in claim 4 in which, said defining step comprises defining said hot strip means by extruding a single hot strip from an extrusion die of an extruder, said disposing step comprises feeding said flexible member into said extrusion die simultaneously with the feeding of said polymeric material in a flowable condition from said extruder to define said single strip and simultaneously embed said flexible member axially therealong.

11. A method as set forth in claim 10 and including the step of feeding said toothed belt element directly from said nip to said cylinder means under a controlled tension.

12. A method as set forth in claim 4 in which said defining step comprises defining said hot strip means consisting of a plurality of hot strips each having a substantially quadrilateral cross-sectional configuration, said disposing step comprises laminating said elongate member between an adjoining pair of said hot strips prior to said working step, said strips with said flexible member laminated therebetween defining a laminated construction having said overall substantially self-supporting quadrilateral cross-sectional configuration and said particular thickness.

13. A method as set forth in claim 12 and including the step of feeding said toothed belt element directly from said nip to said cylinder means under a controlled tension.

14. A method as set forth in claim 4 and comprising the further step of bonding fabric means against a surface of said strip means prior to said working step, said working step resulting in said fabric means being disposed in an undulating configuration which defines an exposed surface of the tooth form of said toothed belt element and also defines fabric means of the toothed belts defined using said belt element.

15. A method as set forth in claim 4 in which said helically wrapping step comprises helically wrapping said toothed belt element on said cylinder means at a particular helix angle relative to the longitudinal axis of said cylinder means, and said working step comprises defining individual teeth in said toothed belt element with a pitch therebetween which corresponds to the pitch of said grooves in said cylinder means while defining each of said teeth at a skew angle relative to the longitudinal axis of said belt element which corresponds roughly to said helix angle whereby each tooth of each turn is disposed in said same axial groove as said associated teeth of said other helical turns to provide said substantial axial alignment as a substantially perfect alignment.

16. In an apparatus for making toothed endless power transmission belts each having a particular thickness and comprising means for forming a polymeric material to define an elongate toothed belt element, means for helically wrapping said toothed belt element on cylinder means with successive helical turns in adjoining side-by-side relation and with each tooth of each turn in substantial axial alignment with associated teeth of other helical turns, a device for bonding said adjoining helical turns together to define a toothed belt sleeve, and a cutting apparatus for cutting said sleeve to define a plurality of said toothed belts, the improvement wherein said forming means comprises means defining hot strip means of said polymeric material with said strip means having an overall substantially self-supporting quadrilateral cross-sectional configuration throughout the length thereof and a thickness throughout the length thereof roughly equal to said particular thickness, means for disposing at least one elongate flexible load-carrying member in said hot strip means to define a corresponding load-carrying member in said endless belts, and cooperating working rollers for thereafter working said self-supporting quadrilateral cross-sectional configured strip means to define said toothed belt element with a thickness at the teeth thereof roughly equal to said particular thickness and in advance of said cylinder means, said disposing means being adapted to dispose said flexible member axially along and within said hot strip means prior to movement thereof through said cooperating working rollers so that said hot strip means engages said flexible member substantially completely around the same throughout substantially the entire length thereof that is disposed within said hot strip means, said working rollers cooperating to work a portion of said strip means along its entire length while keeping said flexible member substantially intact to define said toothed belt element having said flexible member extending in a rectilinear path along its full length.

17. An apparatus as set forth in claim 16 in which, said forming means defines strip means of said polymeric material in the form of an uncured polymeric material, said cooperating working rollers comprise a toothed forming roller and a backup roller which cooperate to work said strip means between the nip thereof, said bonding device subjects said adjoining helical turns to a curing environment to provide said bonding and simultaneously therewith provide curing of said belt sleeve, and further comprising means for cooling said sleeve prior to cutting thereof with said cutting apparatus.

18. An apparatus as set forth in claim 17 in which said backup roller is a plain right circular cylindrical roller and said cooperating rollers are adapted to compress, displace, and reshape portions of said strip means between said nip to define said toothed belt element.

19. An apparatus as set forth in claim 18 in which, said forming means defines said hot strip means as a single hot strip.

20. An apparatus as set forth in claim 19 in which said forming means comprises an extruder having an extrusion die which is adapted to extrude said single hot strip, said disposing means comprises means for feeding said flexible member into said extrusion die simultaneously with the feeding of said polymeric material in a flowable condition from said extruder to define said single strip and simultaneously embed said flexible member axially therealong.

21. An apparatus as set forth in claim 20 and including means for feeding said toothed belt element directly from said nip to said cylinder means under a controlled tension.

22. An apparatus as set forth in claim 19 in which said disposing means comprises means for slitting said single strip along its axial length to define a slit having a bottom, and means for urging said flexible member into said slit to position same along said bottom.

23. An apparatus as set forth in claim 19 in which said forming means comprises a plurality of extruders each having an associated extrusion die, said extruders and extrusion dies being adapted to define said hot strip means as a plurality of hot strips each having a substantially quadrilateral cross-sectional configuration, and said disposing means comprises means laminating said flexible member between an adjacent pair of said hot strips prior to movement thereof through said working rollers to define a laminated construction having said overall substantially self-supporting quadrilateral cross-sectional configuration and said particular thickness.

24. An apparatus as set forth in claim 23 and further comprising means bonding fabric means against a surface of one of said strips prior to movement thereof through said working rollers, said fabric means being disposed in an undulating configuration upon exiting said working rollers and defining an exposed surface of the tooth form of said toothed belt element.

25. An apparatus as set forth in claim 23 and including means for feeding said toothed belt element directly from said nip to said cylinder means under a controlled tension.

26. An apparatus as set forth in claim 19 and including means for feeding said toothed belt element directly from said nip to said cylinder means under a controlled tension.

* * * * *